Figure 1:
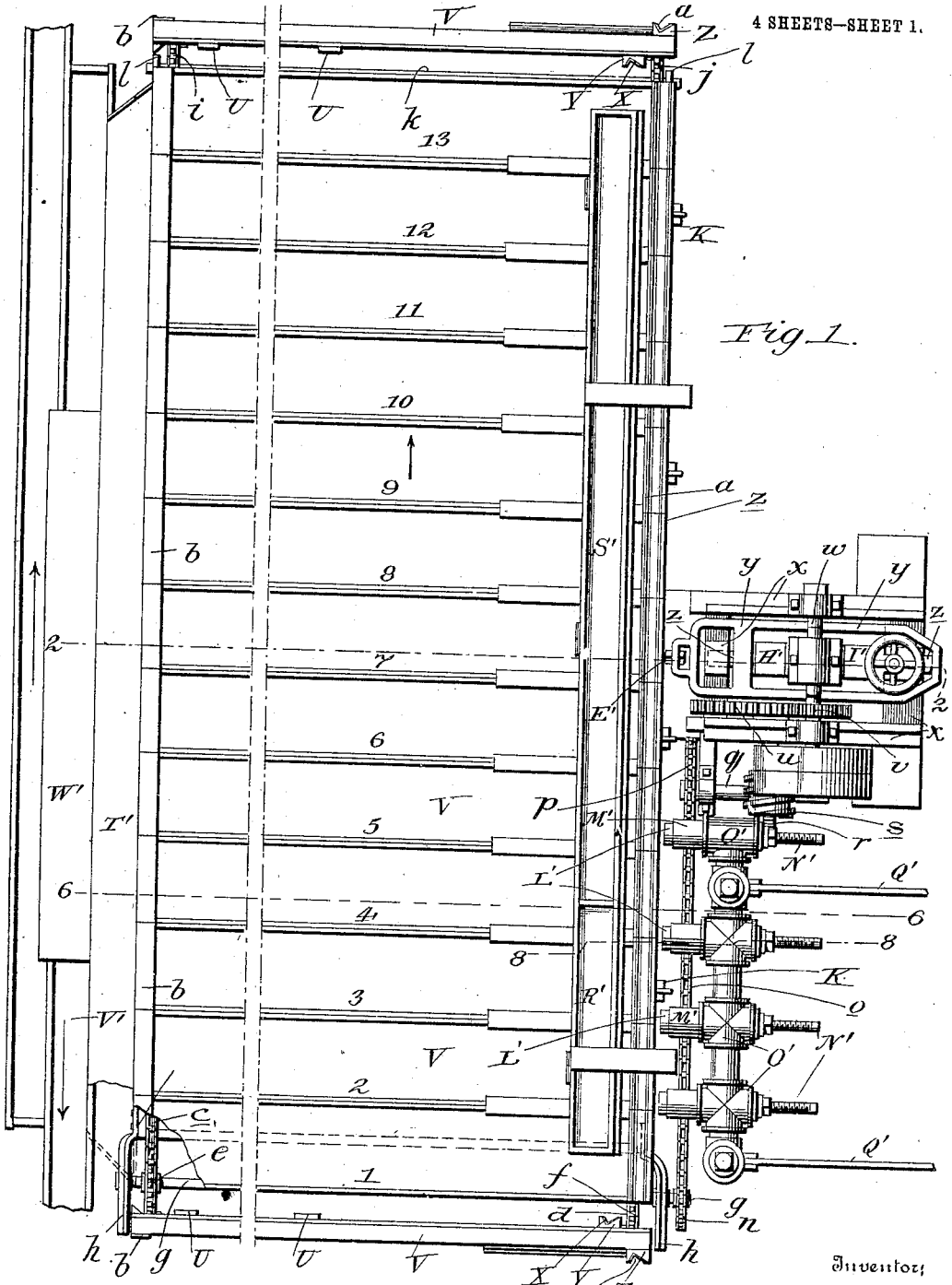

No. 838,058. PATENTED DEC. 11, 1906.
F. W. SHERMAN.
ORE CONCENTRATING TABLE.
APPLICATION FILED APR. 20, 1905.
4 SHEETS—SHEET 1.

Witnesses
Inventor
Frederic W. Sherman,
By Dodge and Sons,
Attorneys

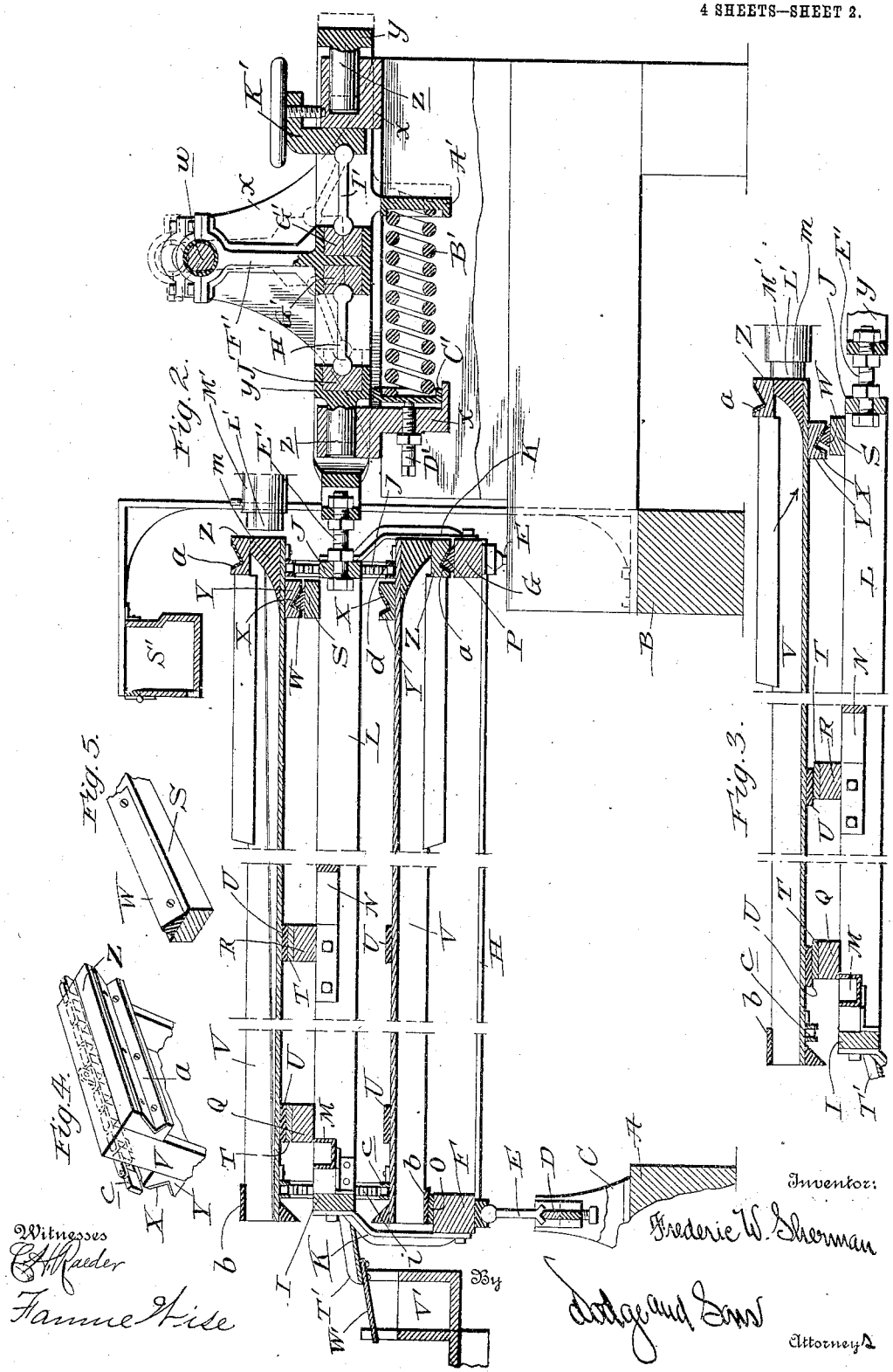

No. 838,058. PATENTED DEC. 11, 1906.
F. W. SHERMAN.
ORE CONCENTRATING TABLE.
APPLICATION FILED APR. 20, 1905.
4 SHEETS—SHEET 3.
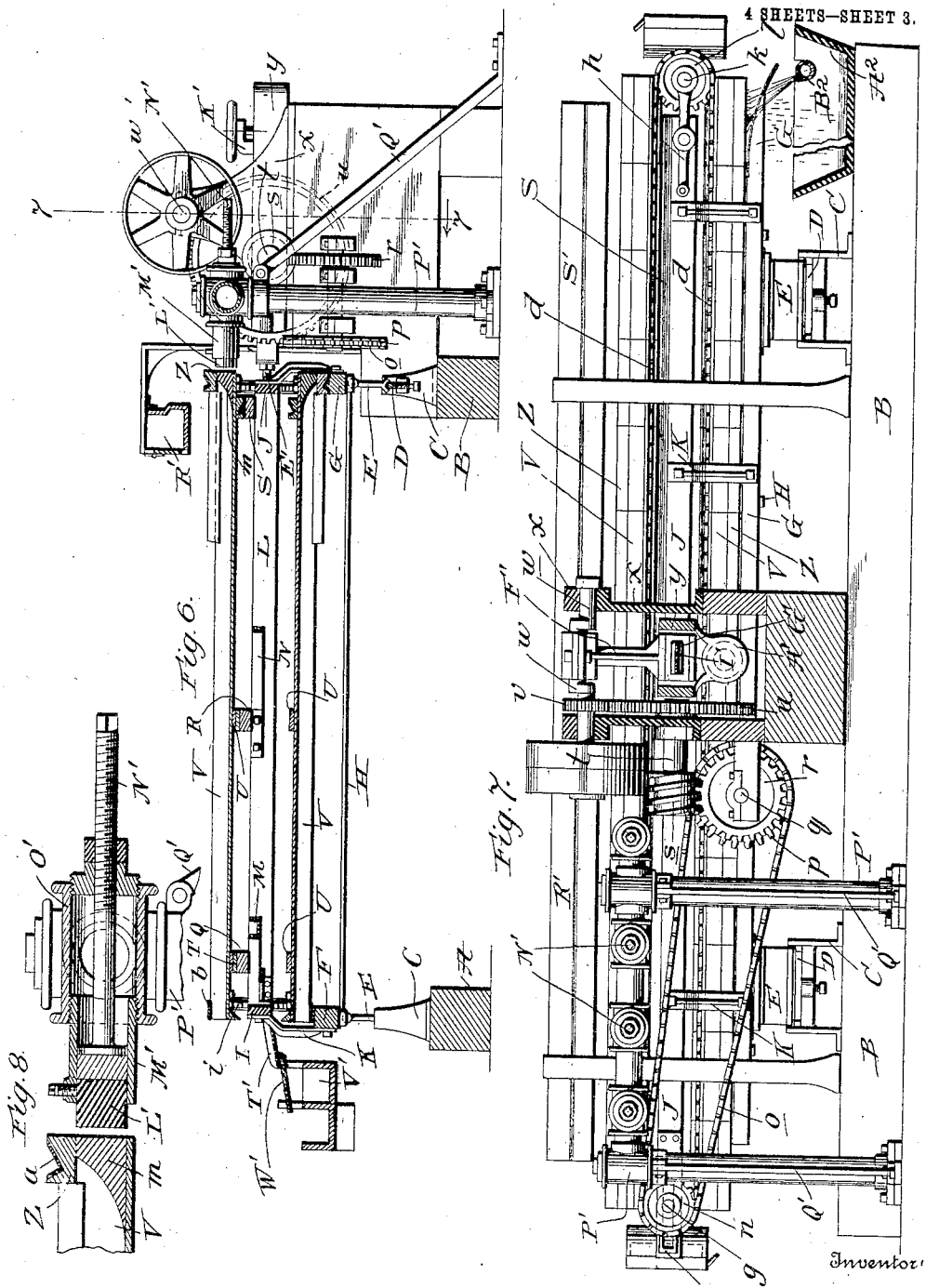
Witnesses
Inventor
Frederic W. Sherman,
By Dodge and Sons
Attorneys.

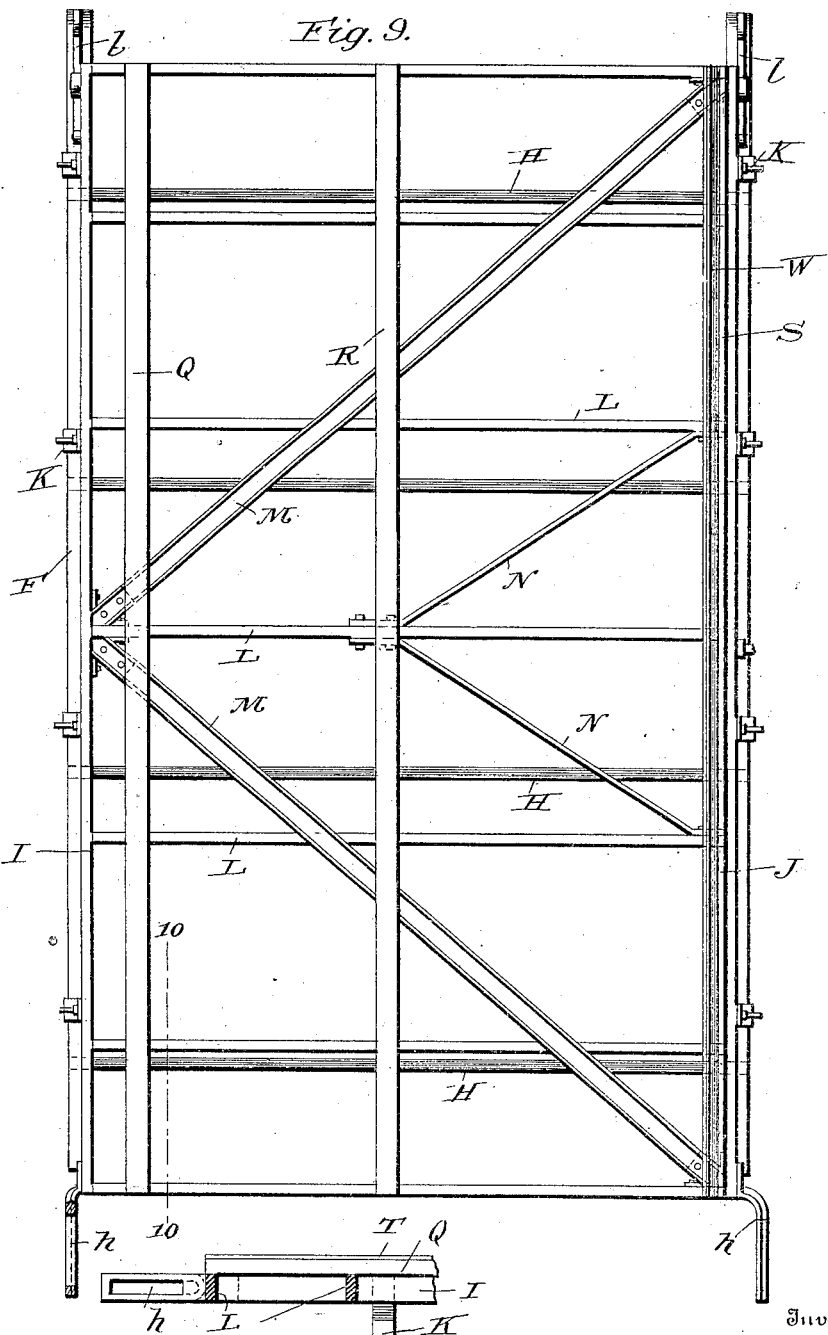

UNITED STATES PATENT OFFICE.

FREDERIC WOOSTER SHERMAN, OF PARK CITY, UTAH.

ORE-CONCENTRATING TABLE.

No. 838,058.　　　　Specification of Letters Patent.　　　　Patented Dec. 11, 1906.

Application filed April 20, 1905. Serial No. 256,521.

*To all whom it may concern:*

Be it known that I, FREDERIC WOOSTER SHERMAN, a citizen of the United States, residing at Park City, in the county of Summit and State of Utah, have invented certain new and useful Improvements in Ore-Concentrating Tables, of which the following is a specification.

My present invention pertains to improvements in ore-concentrating tables, the construction and advantages of which will be hereinafter set forth, reference being had to the annexed drawings, wherein—

Figure 1 is a top plan view of the table; Fig. 2, a transverse vertical sectional view on the line 2 2 of Fig. 1; Fig. 3, a similar view, the parts being shown in a different relation and portions of the apparatus being omitted; Fig. 4, a perspective view of a portion of one of the panels or trays; Fig. 5, a similar view of one of the guide-rails; Fig. 6, a transverse vertical sectional view on the line 6 6 of Fig. 1; Fig. 7, a side elevation of the apparatus, parts being shown in section, on the line 7 7 of Fig. 6, and the spraying device being likewise shown in part; Fig. 8, a longitudinal sectional view of one of the bumpers, taken on the line 8 8 of Fig. 1; Fig. 9, a top plan view of the supporting frame or bed, and Fig. 10 a vertical sectional view of a portion thereof on the line 10 10 of Fig. 9.

The main object of my invention is to construct a concentrating-table suitable for and capable of separating or concentrating fine ores and also slimes.

The machine hereinafter described is capable of saving the first pulp as well as the tailings; and the invention has for its further object the provision of means whereby this may be accomplished.

The apparatus may be described in general terms as comprising a series of light trays or panels mounted and movable upon a suitable support, means for advancing the trays along said support, and means acting upon the trays which first receive the pulp to impart to them a series of jars or impacts as they are moved longitudinally back and forth across the support.

The apparatus also contemplates the use of a support for the trays or panels of peculiar construction which may be adjusted in wind, and thus alter the inclination of the trays, which change, acting in conjunction with the impact or jarring mechanism, causes a substantially complete separation between the mineral and the gangue.

Referring to the drawings, A and B denote the main or supporting timbers, surmounted by castings or foot-pieces C, each of which is provided with a vertically-adjustable bearing piece or block D, as is usual. Mounted upon the blocks are the rocker-plates E, the upper ends of which find their bearings in suitable blocks secured to the two lower longitudinal members F G of the supporting-frame. Said members are connected together at various points throughout their length by cross-braces H and are secured to the upper longitudinal members I J by brackets or arms K. (Best shown in Fig. 2.) Said members I and J are connected to each other by a series of parallel cross-braces L. A pair of oppositely-disposed angle-braces M extend from the center of member I to the ends of the member J, while a second pair of similarly-disposed braces N are connected to the central brace L of the series and extend therefrom to the adjacent braces, being secured thereto at their points of junction with the longitudinal member J. This construction secures a flexible table or support and enables the same to be readily placed in wind to effect an adjustment of the trays or panels necessary to the proper separation of the particular grade of material under treatment, as will hereinafter more fully appear. Mounted and secured upon the upper face of member F is a flat guide rail or bar O, while member G carries a guide-rail P, preferably of the form shown in Fig. 2.

Secured upon the cross-bars L of the supporting-frame are three longitudinally-disposed bars or members Q, R, and S, the members Q and R being provided with flat bearing-plates T, which work against similar plates U, secured upon the lower face of each of the trays or panels V. Member S carries a guide-rail W, the upper faces of which are inclined, (see Figs. 2 and 5,) the long bearing or supporting face thereof standing at approximately sixty degrees to the vertical, while the shorter or arresting bumping-face is at right angles to the long face. Rail W passes into a shoe X of complemental form, secured in the under face of a cross-bar Y, one of such bars being attached to the under face of each of the trays or panels V. To the outer face of each tray or panel, at the head thereof, is secured a cross-bar Z, carrying an angle-plate or shoe a of the same form as shoe X and designed, when the trays are being returned to the feed end of the apparatus, to properly sustain the same. A flat bar b is secured to the outer face of each panel, adjacent to the discharge end thereof, said bar resting on the guide-rail O as the trays travel along the lower stretch. The trays or panels, as is usual in machines of this general type, are arranged side by side, so as to form, in effect, an endless belt. The connection may be accomplished in any suitable manner so long as sufficient flexibility is maintained, and the panels may be moved endwise independently of each other to a limited extent.

In the drawings I have shown two endless sprocket-chains c d, to which the opposite ends of the panels are connected, the chains passing about sprocket-wheels e f, mounted upon a shaft g, carried by brackets or arms h, secured to the longitudinal members I and J, and also about sprockets i j, mounted upon a shaft k, said shaft being likewise supported by suitable brackets l. Each panel is provided at its head end with a block m, the inner face of the block being preferably curved, as shown in Fig. 8. The bottom of the tray will, by preference, be formed of canvas or linoleum provided with a thin wooden support. Shaft g carries at its outer end a third sprocket n, a sprocket-chain o passing about said sprocket and another sprocket p, mounted upon a shaft q. Shaft q is likewise provided with a worm-wheel r, which meshes with a worm s, secured to a shaft t, the opposite end of the shaft carrying a gear u. Gear u meshes with a pinion v, splined to a power crank-shaft w, said shaft working in suitable bearings in a fixed housing or bed x. Mounted within the housing is a yoke or casting y, provided with guide-arms z z, Fig. 2, which work in suitable recesses formed in the housing. Said yoke is provided with a downwardly-projecting recessed arm A', adapted to receive one end of a heavy coiled spring B', the opposite end of the spring resting in a cup C', which may be adjusted to vary the tension of the spring by an adjusting-screw D'. Normally the spring tends to draw the yoke to the right, and with it the support or frame upon which the trays are mounted, the yoke being connected to the longitudinal side bar J of the frame by a bolt or bar E'.

A pitman F' is swiveled upon the crank-shaft w and carries at its lower end bearing-blocks G' G', against which rest links H' I', the former at its opposite end working against a bearing-block J', mounted in the yoke y, while the latter at its rear end has its bearing in a vertically-adjustable block K'. This toggle works in opposition to the spring and serves to move the yoke y and the frame to the left, at the same time putting the spring under compression.

Located adjacent to the feed end of the table and standing in line with the head of the second, third, fourth, and fifth panels is a series of abutments, bumpers, or stops. In the form illustrated each bumper comprises a block L', mounted in a horizontally-disposed tube or sleeve M' and adjustable lengthwise therein by means of a threaded stem N', whereby the block may be protruded to a greater or less extent. Each tube or sleeve M' is mounted in a suitable casting O', all of said castings being secured together, as shown, and the structure as a whole mounted upon vertical columns P', so that the blocks L' stand in alinement with the head-blocks m of the adjacent panels. Braces Q' serve to sustain the bumpers in proper position against the impact of the panels when they are thrown against them by the action of the spring.

The construction of the bumpers may be varied from that shown, and any form which will insure stability and afford adjustment for wear and for the purpose of securing a greater or less impact, according to the nature of the material undergoing treatment, may be employed.

The pulp to be treated is fed into the panels from a trough R', while the wash-water passes thereto from a trough S'. The material leaving the lower open ends of the panels or trays passes onto a shelf T', thence to the middling-launder V', or onto a second shelf W', and into the tailing-launder, according to the position of the panels or trays.

The operation of the apparatus is as follows: When it is proposed to treat slimes, the table or frame is placed in wind so as to elevate the discharging end of the trays or panels on the feed end of the table, and thus prevent the slime or pulp from moving directly off of the same. While thus maintained upon the panels, a separation between the mineral and the gangue is effected through the agency of the reciprocating movement imparted to the panels and the impact of the panels against the bumpers. In connection with the action of the bumpers against which the panels are moved quite rapidly, so that each panel is given a number of jars or impacts before it passes from one bumper to the next or out of line with the last bumper, attention is directed to the operation of the toggle and spring mechanism hereinbefore described. As will be readily seen, the velocity of the table at any instant of its reciprocating stroke is the resultant of two variable forces: First, if the pitman were moved from its lowest position upward at a uniform rate the mechanical arrangement would cause the table to increase its velocity at each point of its backward stroke until the end of the stroke is reached; but, second, the pitman travels at a variable rate, which has its maximum velocity at the point where the pitman is just half-way between its lowest and highest positions. The resultant horizontal motion imparted to the table has its greatest velocity at a point very near the end of the backward stroke. From this point until the end of the stroke is reached the motion is retarded, until at the end of the stroke the velocity is zero. Obviously the motion best adapted to advance the mineral particles upon the table-surface would be one whose velocity increased continuously throughout the stroke and then dropped at once from its maximum velocity to zero. The arrangement of the present apparatus is such that this result is accomplished as the panel strikes its bumper just as the panel reaches its greatest speed a short distance from the end of the stroke. Suppose the table to be set in motion and the frame adjusted so as to give to the panels an inclination (depending upon the fineness of the ore) sufficient to hold a bed of pulp of a depth best suited to be first stratified and then washed and consider the effect of the table action on the pulp upon one of these panels as the belt moves slowly forward on the frame. The frame and superstructure of panels now begin their backward stroke. Panel numbered "2" has been gradually accumulating a sufficient load of pulp during some sixty preceding strokes, and if the material be very fine the bed of pulp is about one and one-half inches deep at the back end of the panel. As the panel starts backward its velocity gradually increases until at the greatest speed it comes into contact with its bumper and is abruptly stopped. The result is that a decided impact is given to each mineral particle, causing it to move up higher on the panel or against the slowly-moving current of water that is in the feed. This advance of the mineral particles is more pronounced upon those particles which are nearest the bottom of the pulp, as it is here that the current is slightest; but the particles nearest the bottom, because of the action of gravity and because of the settling return-blow, hereinafter referred to, are those of the greatest specific gravity. Therefore the heaviest minerals tend to range themselves higher up on the panels. The panels being light and rigid, the full impact or force of the blow is communicated to every point throughout the panel. This fact and the further fact that each panel is sufficiently independent of the others and of the frame admits of its being suddenly stopped while at its greatest speed, permitting the frame with the other panels, which are out of line with the bumpers, to pass on, slowing up until the end of the stroke is reached. By thus suddenly arresting the movement of the panels a rapid separation of the mineral and gangue is effected.

In the use of the apparatus it has been found that the effect of impact or sudden stoppage was so decided that the ordinary settling of the mineral particles by gravity was not sufficient to produce the best stratification. The necessity for what might be termed a "downward impact" following immediately after the impact referred to above and while the mineral particles were freely moving among themselves became apparent. By the employment of the guide-rail W of the form above described working in connection with the shoes secured upon the under side of the panels this downward impact is provided for. When the panel is brought into contact with the bumper, the parts assume the positions shown in Fig. 3, and the table with the remaining panels is moved to its extreme position at the right. Upon reference to said figure it will be seen that the guide-rail W passes partially out from under the shoe, and in so doing the panel is elevated slightly at its upper end. As the frame again starts forward the substantially vertical face of the guide-rail comes into contact with the corresponding face of the shoe, the result being to give a reverse blow or impact to the panel, which serves to throw the mineral particles down toward the bottom of the panel and also toward the upper or head end of the same, or in the direction indicated by the arrow in Fig. 3. These two reactions produced by the panel coming into contact with bumper and the settling-blow which is effected, as just noted, upon the return stroke follow each other so closely as to be almost simultaneous, but by placing the hand upon the panel they are both distinctly felt.

In the operation of the apparatus pulp and wash-water pass from the troughs R' S', sufficient water being provided to give the pulp the proper consistency and the quantity of pulp and water passing onto the trays or panels being regulated as is usual in machines of this class. The pulp is continuously delivered onto the panels marked 1, 2, 3, and 4 in Fig. 1 of the drawings, the panels in the positions marked 2, 3, 4, and 5 constantly receiving the bumping and jarring motions before described. Consequently when the pulp reaches the position of panel No. 6 it will be completely separated. The mineral and the gangue, owing to their different specific gravities, aided by the effect of the above-mentioned movements, are formed into stratified layers. The feed-water that is carried over the end of the panels in the positions designated 1 2, and also on the left-hand half of panel No. 3, is delivered, when so desired, into a return middling-launder for further treatment. The wash-water, together with the gangue that passes off at the ends of the panels 4, 5, 6, 7, 8, and 9, and the right-hand half of panel No. 3, are allowed to go into the tailing-launder. The wash-water carrying off the lightest material from panels 10, 11, 12, and 13 is delivered to the middling-launder V' for another and further treatment, it being impossible to deliver a clean concentrate on the panel passing over the end of the table without some of the material being washed off with the last of the gangue. Thus to guard against loss from this source the product washed off from the panels in the position last named is returned as a middling with the slime-water for further treatment.

The grade of the concentrates may be regulated by the amount of wash-water used, by the inclination of the panels, and by varying the oscillating movement of the table, which latter adjustment is effected by raising or lowering the toggles in the head motion.

It will of course be understood that a suitable receptacle $A^2$, (shown in Fig. 7,) will be provided for receiving the concentrates beneath the table, they being washed off by a spray passing from a pipe $B^2$ and caught in the receptacle.

Having thus described my invention, what I claim is—

1. In an apparatus for treating pulp, slimes and the like, the combination of a receptacle for receiving the material; means for imparting a reciprocating movement thereto; means independent of the reciprocating means for abruptly stopping the movement of the receptacle in one direction; and means for imparting to the receptacle as it is moved in the opposite direction a jar of impact in a plane approximately vertical to the longitudinal axis of the receptacle.

2. In an apparatus for treating pulp, slimes and the like, the combination of a receptacle; means for reciprocating the same; means independent of the reciprocating means for suddenly arresting the movement of the receptacle while it is traveling in one direction, whereby the particles of heavy specific gravity will be thrown toward one end of the receptacle; and means for imparting to the receptacle as it is moved in the opposite direction a jar or impact in a plane approximately vertical to the longitudinal axis of the receptacle, whereby the particles which are in suspension and in a state of movement will be precipitated.

3. In an apparatus for treating pulp, slimes and the like, the combination of a frame or support; means for reciprocating said support, said means moving the frame with a gradually-increasing speed for a portion of its stroke; a receptacle for the slimes mounted upon said frame or support and free to be moved independently thereof; means for arresting the movement of the receptacle as the reciprocating means reaches its greatest speed; and means interposed between the frame and the receptacle for imparting a jar to the receptacle upon the return movement of the frame.

4. In an apparatus for treating pulp, slimes and the like, the combination of a frame or support; a series of loosely-connected trays or panels mounted upon and movable lengthwise of said support; means for reciprocating the frame and the panels thereon; and means for arresting the reciprocating movement of one or more of said panels at the head of the apparatus and immediately after the pulp has been introduced therein, while the frame continues its sidewise movement, substantially as described.

5. In an apparatus for treating pulp, slimes and the like, the combination of a frame or support; a series of flexibly-connected trays or panels mounted and movable lengthwise of said frame or support; means for reciprocating said frame; means for traversing the trays or panels along said frame or support; means for feeding the pulp and the like into the trays at the forward end of the frame; and a series of bumpers arranged at the forward end of the frame and standing in line with and adapted to act upon those trays only which have just received their charge of pulp.

6. In an apparatus for treating pulp, slimes and the like, the combination of a frame or support; a series of trays or panels mounted thereon; flexible connections intermediate said trays or panels; means for traversing the trays or panels along the frame or support; means for reciprocating said frame or support; means for feeding the pulp and the like to the trays at the forward end of the frame; and a series of adjustable bumpers arranged at the forward end of the frame and standing in line with and adapted to act upon those trays only which have just received their charge of pulp, substantially as described.

7. In an apparatus for treating pulp, slimes and the like, the combination of a frame or support; a series of trays or panels mounted thereon; flexible connections intermediate said trays or panels; means for traversing the trays or panels along and beneath said support; means for reciprocating said support; a series of bumpers standing in line with the panels at the forward end of the apparatus; and means interposed between said frame and trays for imparting a jar to the panels acted upon by the bumpers as the frame is moved away from the bumpers.

8. In an apparatus for treating pulp, slimes and the like, the combination of a frame or support; a series of trays or panels mounted thereon; flexible connections intermediate said trays or panels; means for traversing said trays along the upper face of the frame; means for imparting a sidewise reciprocatory movement to said frame and the panels carried thereby; a series of bumpers standing in line with the ends of the trays at the forward portion of the apparatus; and a guide-rail mounted upon the upper portion of the frame, said rail being provided with an inclined bearing-face upon which the trays may ride when they come into contact with the bumpers, and likewise provided with a face adapted to impart a jar to the trays as the frame is moved outwardly or away from the bumpers, substantially as described.

9. In an apparatus for treating pulp, slimes and the like, the combination of a frame or support; a guide-rail mounted upon the upper face thereof, said rail being provided with an inclined bearing-face and with a face standing at substantially right angles thereto; a series of trays or panels, each of which is provided upon its under face with a shoe complemental in form to the rail and upon which said shoes rest; means for imparting a sidewise movement to the frame; a series of bumpers standing in line with the ends of the trays; and means for moving said trays along the frame or support.

10. In an apparatus for treating pulp, slimes and the like, the combination of a frame or support; a guide-rail mounted thereon, said rail being provided with an inclined bearing-face and with a face standing at substantially right angles thereto; bearing-plates also mounted upon the frame and extending lengthwise thereof; a series of flexibly-connected trays, each of which is provided with a shoe complemental in form to the guide-rail; bearing-plates mounted upon the under face of the trays in line with the bearing-plates carried by the frame; means for advancing the trays along the frame or support; a series of bumpers standing in line with the ends of the trays at the forward portion of the apparatus; and means for imparting sidewise movement to the frame.

11. In an apparatus for treating pulp, slimes and the like, the combination of a flexible frame or support; means for placing said frame or support in wind; a series of flexibly-connected trays mounted and movable upon said frame; a series of bumpers standing in line with the trays at the forward end of the apparatus; and means for imparting reciprocatory movement to said frame.

12. In an apparatus for treating pulp, slimes and the like, the combination of a suitable frame comprising longitudinally-extending members, cross-connecting members, and angularly-disposed braces extending from the center of one side of the frame to the outer portions of the longitudinal member upon the other side of the frame, whereby one side of the frame is made substantially rigid while the other may be placed in wind; means for adjusting said frame to place it in wind; a series of trays mounted upon and movable along said frame; flexible connections intermediate said trays; a series of bumpers located in line with the ends of the trays adjacent to the forward portion of the apparatus; means for imparting a sidewise reciprocatory movement to said frame; and means for imparting a jar to the trays which have been acted upon by the bumpers as said frame moves away from the bumpers, substantially as described.

13. In an apparatus for treating pulp, slimes and the like, the combination of a suitable frame or support; a series of trays or panels mounted and movable lengthwise thereon; flexible connections intermediate said panels; means for feeding pulp and the like into the trays at the forward end of the apparatus; a series of bumpers standing in line with the ends of the panels at the forward end of the apparatus; means interposed between the frame and the trays for imparting a jar to the trays as the frame is moved away from the bumpers; a yoke connected to the frame at one side thereof; a toggle working in conjunction with said yoke to move the frame away from the bumpers; and a spring acting upon the yoke to move the same in opposition to the movement of the toggle, substantially as described.

14. In an apparatus for treating pulp, slimes and the like, the combination of a suitable frame; a guide-rail mounted thereon, said rail being provided with an inclined bearing-face and with a second face standing at approximately right angles thereto; a series of trays mounted upon and movable lengthwise of said frame, each of said trays being provided with a shoe complemental in form to said rail and upon which it normally rests; a series of bumpers standing in line with the ends of the trays at the forward portion of the apparatus; a yoke connected to the frame; a toggle working in conjunction with the yoke and serving when straightened to force the frame away from the bumpers; and a spring acting in opposition to the toggle mechanism and serving to force the yoke in the opposite direction, substantially as described.

15. In an apparatus for treating pulp, slimes and the like, the combination of a frame composed of two pairs of longitudinally-extending bars; brackets connecting said bars; cross-braces connecting the lower pair of bars; a series of parallel braces connecting the upper longitudinal bars; a pair of angularly-disposed braces extending from the center of the outer upper longitudinal bar to the ends of the opposite upper bar; a second pair of angularly-disposed braces connected to and extending from the central cross-brace of the upper parallel series to the longitudinal bar to which the separated ends of the first pair of angularly-disposed braces are connected; means for adjustably supporting said frame; means for imparting a sidewise reciprocatory movement to said frame; a series of flexibly-connected panels mounted upon said frame; means for traversing said panels along said frame; a series of bumpers standing in line with the ends of the panels at the forward portion of the apparatus; and means for imparting a jar to the panels acted upon by the bumpers as the frame is moved away from the bumpers.

16. In an apparatus for treating pulp, slimes and the like, the combination of a frame or support; a series of trays or panels mounted thereon; flexible connections between said trays or panels; means for traversing the trays or panels along the frame or support; means for reciprocating said frame or support, said means moving with a gradually-increasing speed for a part of its stroke; means for feeding the pulp and the like to the trays at the forward end of the frame; means standing in line with those panels which have just received their charge of pulp and arranged to arrest 'the same as the frame-reciprocating means reaches its highest rate of travel; and means for imparting a settling jar to all of the filled trays as the trays are moved away from the arresting means.

17. In an apparatus for treating pulp, slimes and the like, the combination of a flexible frame or support; means for placing said frame or support in wind; a series of flexibly-connected trays mounted and movable upon said frame; a series of bumpers standing in line with the trays at the forward end of the apparatus; means for imparting a settling jar to all of the trays as they are moved away from the bumpers; and means for imparting reciprocatory movement to said frame.

In testimony whereof I have signed my name to this specification in the presence of two subscribing witnesses.

FREDERIC WOOSTER SHERMAN.

Witnesses:
JEROME PAXTON,
B. L. CRIPPS.